(12) United States Patent
Rivier et al.

(10) Patent No.: US 8,615,074 B1
(45) Date of Patent: Dec. 24, 2013

(54) METHOD AND APPARATUS OF ANALYZING CUSTOMER CALL DATA AND RELATED CALL INFORMATION TO DETERMINE CALL CHARACTERISTICS

(75) Inventors: Catherine Rivier, Omaha, NE (US); Michael J. Moore, Omaha, NE (US); Erika Nelson Kessenger, Denver, CO (US)

(73) Assignee: West Corporation, Omaha, NE (US)

( * ) Notice: Subject to any disclaimer, the term of this patent is extended or adjusted under 35 U.S.C. 154(b) by 224 days.

(21) Appl. No.: 12/984,802

(22) Filed: Jan. 5, 2011

(51) Int. Cl.
*H04M 3/00* (2006.01)
*H04M 5/00* (2006.01)

(52) U.S. Cl.
USPC ............................ 379/265.06; 379/265.09

(58) Field of Classification Search
USPC ........................... 379/265.06, 265.09
See application file for complete search history.

(56) References Cited

U.S. PATENT DOCUMENTS 5,943,416 A * 8/1999 Gisby ...................... 379/265.13
2010/0158237 A1 * 6/2010 McCormack et al. ... 379/265.06

* cited by examiner

*Primary Examiner* — Quynh Nguyen

(57) ABSTRACT

A method and apparatus of processing a customer call is disclosed. The customer call may be initiated for an IVR type system or a live agent. An example method of processing the call may include receiving customer call data and recording the customer call data in a database server. The method may also include performing speech analytics on the recorded customer call data to determine instances of predefined information that occurred during the customer call, and displaying the results of the speech analytics on a user interface. The call analytics may populate a dashboard interface that provides a data analyst with an opportunity to understand the positive and negative portions of the call for future call improvement.

15 Claims, 10 Drawing Sheets

FIG. 3

Query Output
Per audio file:
Per query, hit Y/N and location within the audio
301

302

| | Competitor Mention Queries | | | | Product Mention Queries | | | |
|---|---|---|---|---|---|---|---|---|
| | C1 | | C2 | | P1 | | P2 | |
| | Hit | Loc. | Hit | Loc. | Hit | Loc. | Hit | Loc. |
| Audio File #1 | Y | 1:31 | Y | 6:01 | N | - | Y | 4:04 |
| Audio File #4 | Y | 3:17 | N | - | N | - | N | - |
| Audio File #5 | N | - | N | - | Y | 0:24 | Y | 1:17 |

Survey Data
Per survey:
Respondent demographics, numeric survey responses
303

304

| | Respondent Demographics | | | Numeric Survey Responses | | |
|---|---|---|---|---|---|---|
| | Info1 | Info2 | Info3 | Q1 | Q2 | Q3 |
| Survey #1 | xxxx | xx | xxxxx | 5 | 4 | 4 |
| Survey #2 | xxxx | xx | xxxx | 3 | 2 | 5 |
| Survey #3 | xxxx | xx | xxxxxx | 4 | 1 | 1 |
| Survey #4 | xxxx | xx | xxxxxx | 5 | 4 | 5 |
| Survey #5 | xxxx | xx | xxxxx | 2 | 5 | 5 |

Audio Files
Per survey:
Full call audio and/or survey comment audio
305

306

| | Call Audio | Comment Audio |
|---|---|---|
| Survey #1 | ▶ (Listen) | |
| Survey #2 | ▶ (Listen) | ▶ (Listen) |
| Survey #3 | ▶ (Listen) | |
| Survey #4 | ▶ (Listen) | ▶ (Listen) |
| Survey #5 | ▶ (Listen) | ▶ (Listen) |

| Event | Result | Points | Attempts | |
|---|---|---|---|---|
| cu0505_GetCallerType_DM | success | 1 | 1 | |
| mi0305a_GetDigitsMemberNumber_DM | failure | 2 | 2 | |
| mi0304_BeginsWithLetterYN_DM | success | 1 | 1 | |
| mi0305_GetDigitsMemberNumber_DM | success | 1 | 2 | |
| mi0420_GetMemberDateOfBirth_DM | success | 1 | 1 | |
| mi0355_NameConfirmation_DM | success | 1 | 1 | |
| cu0141_MemberDynamicProductMenu_DM | command | 1 | 2 | |
| cu0553_MemberQTMainMenu_DM | success | 1 | 1 | |
| un1403_AskMedicalOrDental_DM | success | 1 | 2 | |
| Usability Score | | 10 | 13 | 76.9% |

| Event | Result | Points | Attempts | |
|---|---|---|---|---|
| cu0505_GetCallerType_DM | success | 1 | 1 | |
| mi0305_GetDigitsMemberNumber_DM | success | 1 | 2 | |
| mi0420_GetMemberDateOfBirth_DM | success | 1 | 1 | |
| mi0355_NameConfirmation_DM | success | 1 | 1 | |
| cu0141_MemberDynamicProductMenu_DM | success | 1 | 2 | |
| cu0142_ConfirmMemberDynamicProductMenu_DM | success | 0.5 | 1 | |
| cu0553_MemberQTMainMenu_DM | success | 1 | 1 | |
| un1403_AskMedicalOrDental_DM | success | 1 | 2 | |
| Usability Score | | 7.5 | 11 | 68.2% |

FIG. 8A

| Event | Result | Points | Attempts | |
|---|---|---|---|---|
| cu0505_GetCallerType_DM | success | 1 | 1 | |
| mi0305_GetDigitsMemberNumber_DM | success | 1 | 1 | |
| mi0420_GetMemberDateOfBirth_DM | success | 1 | 1 | |
| mi0355_NameConfirmation_DM | success | 1 | 1 | |
| cu0141_MemberDynamicProductMenu_DM | command | 1 | 1 | |
| cu0553_MemberQTMainMenu_DM | success | 1 | 1 | |
| un1403_AskMedicalOrDental_DM | success | 1 | 1 | |
| Usability Score | | 7 | 7 | 100.0% |
| | | Points | Attempts | |
| Overall Usability Score | | 24.5 | 31 | 79.0% |

FIG. 8B

METHOD AND APPARATUS OF ANALYZING CUSTOMER CALL DATA AND RELATED CALL INFORMATION TO DETERMINE CALL CHARACTERISTICS

TECHNICAL FIELD OF THE INVENTION

This invention relates to a method and apparatus of analyzing a recorded customer call and/or a customer survey. More particularly, this invention relates to a method, apparatus, and computer program product that permits customer call information and customer survey information to be collected, stored and analyzed to determine customer satisfaction and other characteristics of the customer call.

BACKGROUND OF THE INVENTION

Quantitative customer survey results and other forms of customer feedback may provide insight into a customer's level of satisfaction with a particular company's services. Especially in instances where a customer contacts a service department over the phone and receives customer support. However, receiving feedback service scores from a customer as quantized levels of satisfaction (1—less satisfied, 2, 3, 4 and 5—highly satisfied, etc.) leaves a large level of uncertainty as to what each customer really likes or dislikes about a particular company, product and/or service.

Today, analyzing the data associated with a customer call is mostly a manual procedure. This can be burdensome and difficult to analyze as the recorded components of a customer call and how the customer ranked various services via a survey score are not easy to review and understand in a reasonable period of time. Data analysts are required to review the survey data and identify the individual customer and their respective account. Next, the data analyst must also access data in remote locations to listen to the recorded call (if available) to identify the trouble areas of the call. Once the call and/or comment-based recordings are made available, most analysis is done manually, on an ad-hoc level. Even advanced audio mining does not provide a concise and real-time analysis of the customer's true customer service experience.

If data analysis is performed without a corresponding audio mining application then samplings of calls must be listened to individually. This leaves different data analysts with the responsibility of making statements and decisions about the entire population of customers based on various call recordings. Such a task is usually the only situation for survey comment analysis. Any data analysis must be performed using a separate tool and linked back manually to the macro-level customer survey data, if linked back at all, in an effort to be efficient. In such instances where speech analytics are used, the entire process is performed in disparate systems, which is long and burdensome and far from a real-time analysis.

SUMMARY OF THE INVENTION

One example embodiment of the present invention may include a method of processing a customer call. The method may include receiving customer call data, and recording the customer call data in a database server. The method may also include performing speech analytics on the recorded customer call data to determine instances of predefined information that occurred during the customer call, and displaying the results of the speech analytics on a user interface.

Another example embodiment of the present invention may include an apparatus configured to process a customer call. The apparatus may include a receiver configured to receive customer call data, a memory configured to record the customer call data, and a processor configured to perform speech analytics on the recorded customer call data to determine instances of predefined information that occurred during the customer call. The apparatus may also include a user interface configured to display the results of the speech analytics.

BRIEF DESCRIPTION OF THE DRAWINGS

FIG. 3 illustrates example screenshots of the call data that has been processed and populated in a dashboard interface according to example embodiments of the present invention.

FIGS. 8A and 8B illustrate example screenshots of the customer usability scores and related call data that has been processed and populated in a dashboard interface according to example embodiments of the present invention.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention may include providing dynamic and interactive access to a customer's recorded call, and access to recorded responses available from a survey dashboard application. Such a dashboard interface may include a graphical user interface (GUI) that is customized for the data analyst's preferences. The survey results may be present on the dashboard interface and may be viewed by a data analyst.

The survey may provide insight into the customer's experiences. The customer records may provide analysis results on individual calls and/or comments across a pool of customers to provide insight into the company's customer satisfaction scores. The analysis of customer records may lead to information used to deliver tangible results into what needs to be fixed to improve customer satisfaction scores and overall customer satisfaction.

Figure 1:
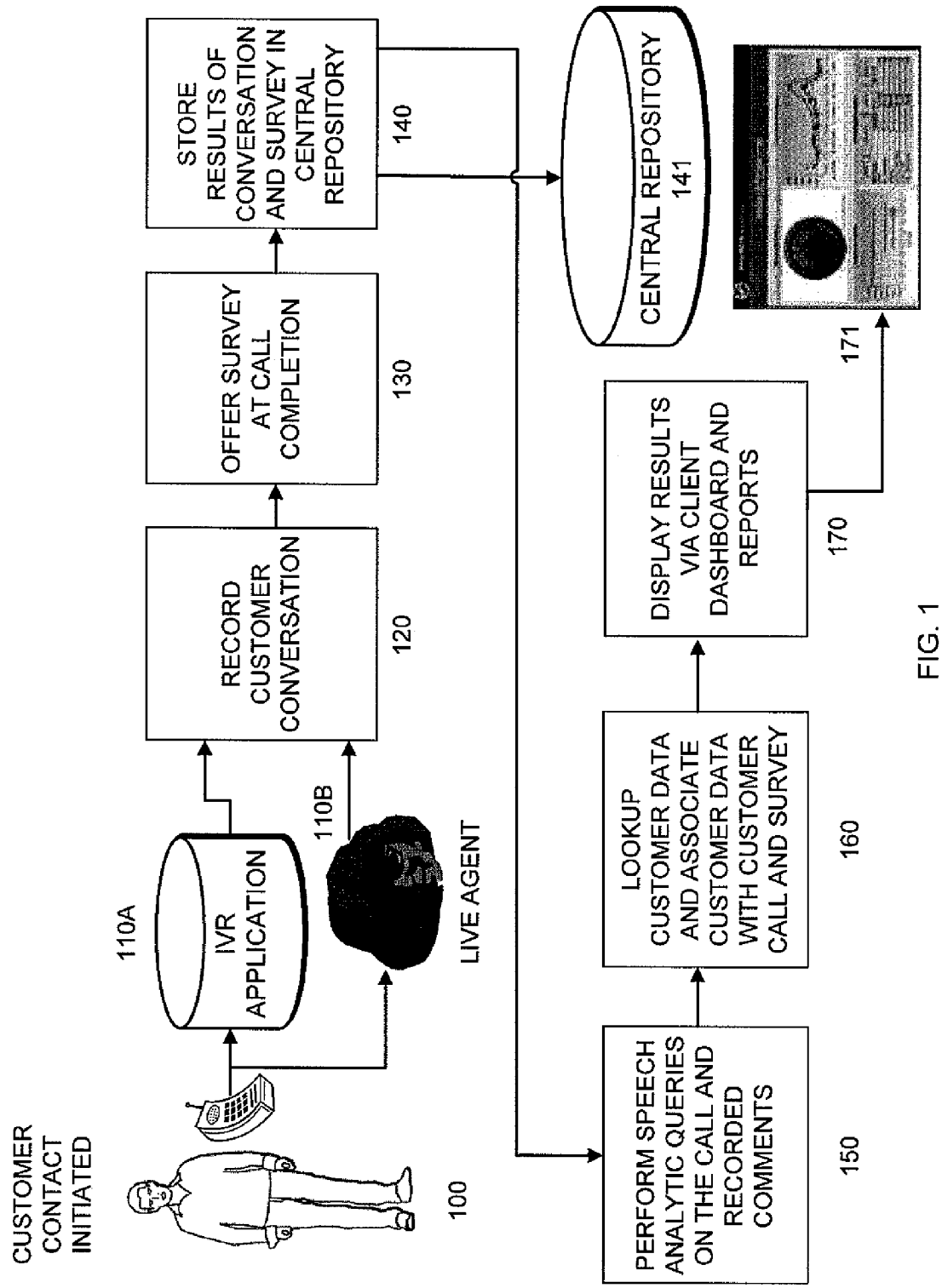
FIG. 1 illustrates an example logic/flow diagram of the customer's interaction with the call processing operations according to example embodiments of the present invention.

FIG. 1 illustrates an example logic diagram of a service call, according to example embodiments of the present invention. Referring to FIG. 1, at the time of a service call, a customer 100 contacts their service provider and speaks with a live customer service agent 110B or an automated interactive voice response (IVR) application 110A. The customer call is recorded at operation 120, and upon completion of the call the customer is offered a survey at operation 130. The results of the conversation and survey are written to a central repository 141 at operation 140. The conversation data and survey data may be written in real-time to the centralized repository 141, which may be a local or remote database server.

As noted above, at the completion of a call, a survey is provided to the customer to gauge their level of satisfaction with the level of service provided. Survey scores may include both numeric data (i.e., the customer selects a numeric field ranking in response to a survey question) and/or free-form text or voice files recorded for a customer verbatim comment. Survey results may be written in near real-time to the centralized repository 141.

Once the call is written to memory, near real-time speech analytic queries may be executed against the recorded call data and speech recorded survey comments (if available). The analytics are based on predefined terms and plain language responses to see if a match is found for any of the pre-defined queries. For example, words and phrases, such as, "hate", "not like", "not", "no", and other negative words and phrases may be discovered from audio recordings of the customer's voice, and data file transcripts of the customer's conversation, which may be created after the customer's voice is recorded.

In another example, positive words and phrases, such as, "like", "satisfied", "happy", "pleased", "good", etc., may also be discovered from speech analytic queries based on pre-defined query content. These positive words and phrases may provide the customer service feedback procedure with info'rmation regarding the elements of the call that are approved by the customer(s). The speech analytic queries are performed on the call data and recorded comments of the survey data at operation 150. Next, a lookup of customer demographic data, customer account data, and any transactional data, is also performed and associated with both the customer call and the customer survey, at operation 160. All of these portions of data are linked together within the centralized repository 141 to provide data metric reports, graphs and other information reporting tools that may be useful for a customer or service representative viewing the results of the customer call and/or customer survey.

The individual numeric customer survey results and other reporting data may be displayed within the client dashboard 171 at operation 170, along with a link to the recorded call, and a visual legend that indicates which (if any) pre-defined query results were present within the call. Details of the dashboard data are illustrated in FIG. 3, and are discussed in detail below. Other example dashboard data may include any confidence scores associated with the customer survey results or call data, and key demographic data associated with the customer. This data provides the data analyst with a customized user interface to view, manipulate and analyze the results of the customer or customers and their experiences with the service offered by the IVR application or live agent.

All macro-level statistics related to the survey scores, analytics query results, demographic data, etc. are updated to include the new call. The new calls are a constant progression for continually updating the previous statistics and other dashboard data. A media player is displayed within the dashboard and provides the ability to listen to an individual recorded call. This media player provides a flexible tool that will allow easy navigation throughout the recorded call. The audio files for calls and comments may also display where in the call each particular query matched, visually.

FIG. 3 illustrates results of the data analytics, according to example embodiments of the present invention. Referring to FIG. 3, a query output result 301 may include an audio file that is created during the analytic process and placed with a simple play option in the dashboard display 306. Each audio file is analyzed to determine for each query if there is a "hit", yes or no, (Y/N) based on a predefined search term, and the location or time within the audio file of the hit (see dashboard data snapshot 302). Further analysis of the audio files #1, #4, #5, etc., demonstrates that certain queries may be performed for both competitor related data and product related data. The specific terms being analyzed will provide a hit at certain locations in the audio files.

As for survey data results, survey data results 303 include respondent demographics and numeric survey responses. Referring to the dashboard data snapshot 304, various survey data #1 through #5 are illustrated as including various different information segments under the customer's demographics to determine information about the customer. Next, the survey response may be illustrated for certain questions to determine if there are weak areas for all customer responses.

Additional data is included in dashboard data snapshot 306, which is related to audio files for the survey 305, and includes recorded call audio or recorded survey audio. The audio is provided with menu options to listen to the tagged segments of audio corresponding to the call or survey comments. This provides the data analyst with an opportunity to target the exact locations where the audio should be manually inspected to determine the true problems associated with a particular call. For example, if survey #3 shows poor survey numeric response (4, 1, 1), then the call could be inspected to determine if the survey #3 corresponding to the particular customer is simply an angry customer with no reason for ranking the survey poorly, or, if something unexpected happened during the call which could be easily fixed. Nevertheless, the entire call should not be screened to find such negative information.

Figure 2:
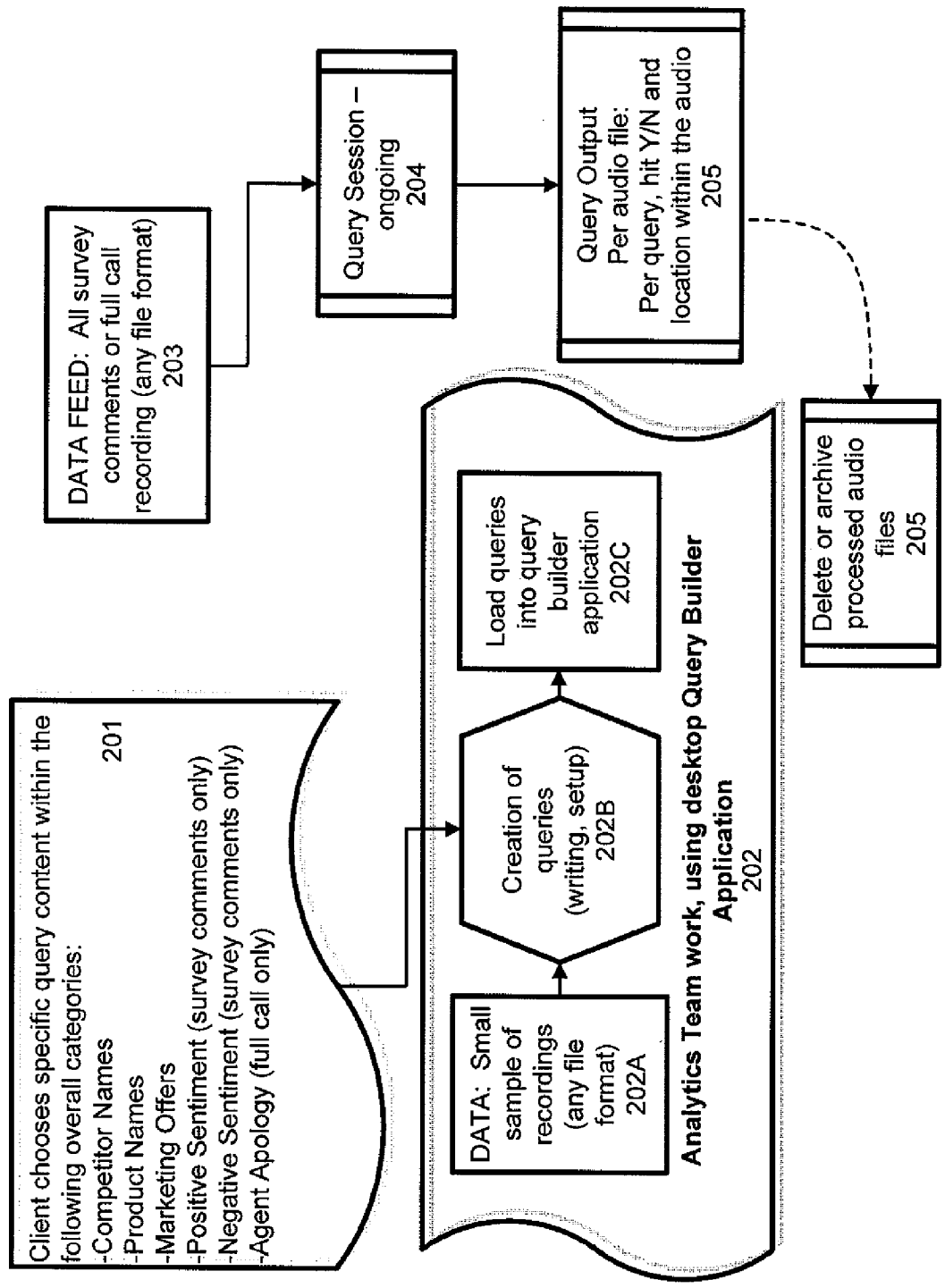
FIG. 2 illustrates an example logic/flow diagram of the query setup operations according to example embodiments of the present invention.

In order to target the desired call and survey data to populate a customized dashboard, before the process begins, the service provider works with a business analyst to define the analytic areas they would like to research within their calls. FIG. 2 illustrates the query setup and data auditing menus used to create the data queries, according to example embodiments of the present invention. Referring to FIG. 2, examples of analysis areas may include, but are not limited to competitive or marketing analysis, new product or service tracking, agent issues, coaching opportunities and overall call center management, legal and script adherence, and overall call or comment types.

Client input may be provided by manual entry or a data file 201 of specific query content within certain categories, such as, competitor names, product names, marketing offers, positive sentiment (survey comments only), negative sentiment (survey comments only) and agent apology (full call only). This means that any instances of predetermined words and phrases associated with these categories may be audited and stored in memory for future analysis.

Once the client's selected search criteria has been established, the analytics team may implement the desktop query builder application 202 to setup and execute the queries. Small samples of recordings may be produced in any file format at operation 202A, the created queries are setup at operation 202B and the queries are loaded into the builder application 202C. The data feed of survey comments and call recordings at operation 203 are provided to the query session 204. Each query output is performed and corresponding audio files are produced per query. A "hit" indicator of yes or no (Y/N) is also provided to show if an audio segment had any positive hits for a particular query, at operation 205. The location of the audio file where the hit occurred is tracked and stored in memory to populate the data analyst dashboard. Once the audio files are created they may be deleted or archived for future reference, at operation 205.

The speech analyst application creates a series of queries within the speech analysis tool, which is designed to identify/capture any instances of the desired analysis data. Performing a query for certain search terms may require a number of queries each of which is aimed at different key phrases spoken by customers that are the same, similar or related to the analysis target areas.

The results of the speech analytics performed on the recorded customer calls and/or recorded comments (when used) that are associated with a set of customer surveys may be displayed on the data analysts' dashboard GUI. Customer calls and/or comments are recorded at the time the call is taken. At the point in time when the call is written to the server memory, a pre-defined set of speech analytics queries are run against the call. The purpose of these queries is to determine if the call contains any spoken phrases/words that match the analysis goals set by the clients.

Examples of queries could include, but are not limited to a company analyzing all calls for mentions of a competitor's name, analyzing calls for specific mentions of a product or service, searching for calls where a customer voices concern with the agent service, validating agent adherence with the pre-defined customer service scripts, particularly positive or negative language being used, etc.

A client-facing dashboard 171 provides access to certain data areas, all linked together, such as, numeric survey score data, at both the individual caller and macro level, demographic data associated with the caller/survey respondent, the recorded customer call linked to an individual survey and recordings of any customer comments tied to the survey, and capability to play and hear these recordings on the spot using a built-in media player.

Any and all audio mining results linked to any of these recordings may include visual identification of analysis areas with a "match" for each customer call (e.g. a specialized icon displayed for each call that contains a "match" to the predefined analysis areas), any confidence scoring related to the analysis areas, and data about when the recorded "match" occurred. Macro-level results for the analysis areas may also be displayed on the dashboard 171, illustrating the total number of calls with analysis results matching the pre-defined queries (e.g. the number of calls when a competitor name was mentioned during the relevant timeframe). The ability to "drill-down" from the macro-level analysis results into the individual recorded calls, displaying the associated survey data, and the ability to view trending data for all survey/demographic/query result data are also capabilities of the dashboard display of analytic data.

Figure 4:
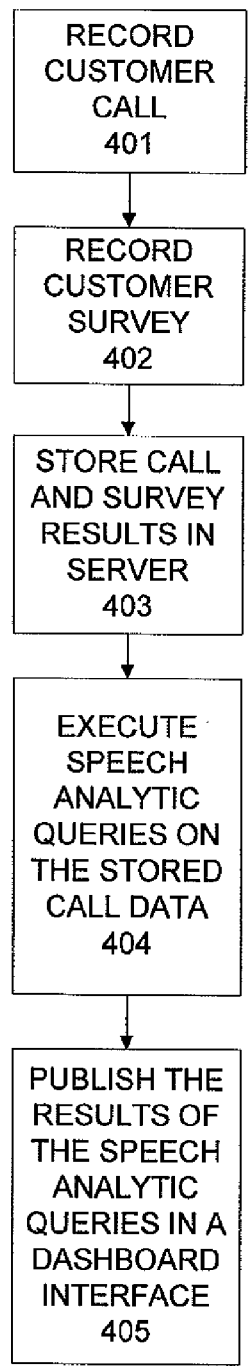
FIG. 4 illustrates an example flow diagram of the customer's interaction with the call processing operations according to example embodiments of the present invention.

One example method according to example embodiments of the present invention may include a set of operations illustrated in FIG. 4. Referring to FIG. 4, a customer initiates a call to a service center and the call is recorded, at operation 401. Next, a survey may be offered to the customer and the results of the customer's responses are also recorded, at operation 402. The call is stored and the survey results are both stored in a server, at operation 403. Next a speech analytic query or queries are performed on the stored call data, at operation 404. The results of the speech analytics are then published and linked to a client dashboard to permit a data analyst to review the results, at operation 405. This display provides an overall ability to analyze within a single dashboard all survey/demographic/query data results together.

Other example embodiments may provide ways to leverage interactive voice response (IVR) application performance data to calculate a numeric customer usability score. Usability may be calculated based on the number of attempts a caller requires to successfully respond to each dialog prompt offered in an IVR call session. The number of times a speech application needs to confirm caller input may also be part of the usability score process.

A numeric score may be assigned to the number of attempts a user requires to successfully satisfy an IVR menu option, in turn, a score is derived from those attempts. A low score for a call indicates poor usability during that call, which is likely a call where the caller encountered a number of errors and/or poor speech recognition was communicated. Call data can be aggregated in a number of ways to measure application usability across customer segments, periods of time, geographic regions, etc. The call data may also be a valuable tool to benchmark application performance. For example, a company may seek to track the impact of application changes internally and externally to determine customer usability against industry competitor applications.

Application usability by potential customers can often be subjective and difficult to quantify. Usability of an IVR application varies from caller to caller and often varies significantly within different parts of the application. Poor usability can result in low customer satisfaction and increased application cost (due to longer calls). Furthermore, unsatisfied customers may quit subscription services and companies may suffer business loss as a result of poor customer service satisfaction ratings.

By assigning a numeric usability score to each IVR prompt that indicates how easy it was for the caller to navigate through that prompt, it may be easier to track each portion of an IVR call and fix problem areas of the IVR call process. A customer usability score is calculated based on the number of attempts required at each prompt, and a point score is assigned to each successful prompt. Points are deducted for each time a speech application must confirm a caller's response, as this indicates a less usable experience.

A usability score is calculated for each call processed by the IVR system, and can be aggregated many ways for reporting, analysis and benchmarking purposes. For example, usability for a unique caller or a caller segment (by value, geography, tenure, revenue, etc.), usability for a specific timeframe (daily, weekly, monthly usability score, etc.), as a measure before/after an application change (to determine impact on application usability), are all examples of data that may be reported based on usability scores.

Figure 5A:
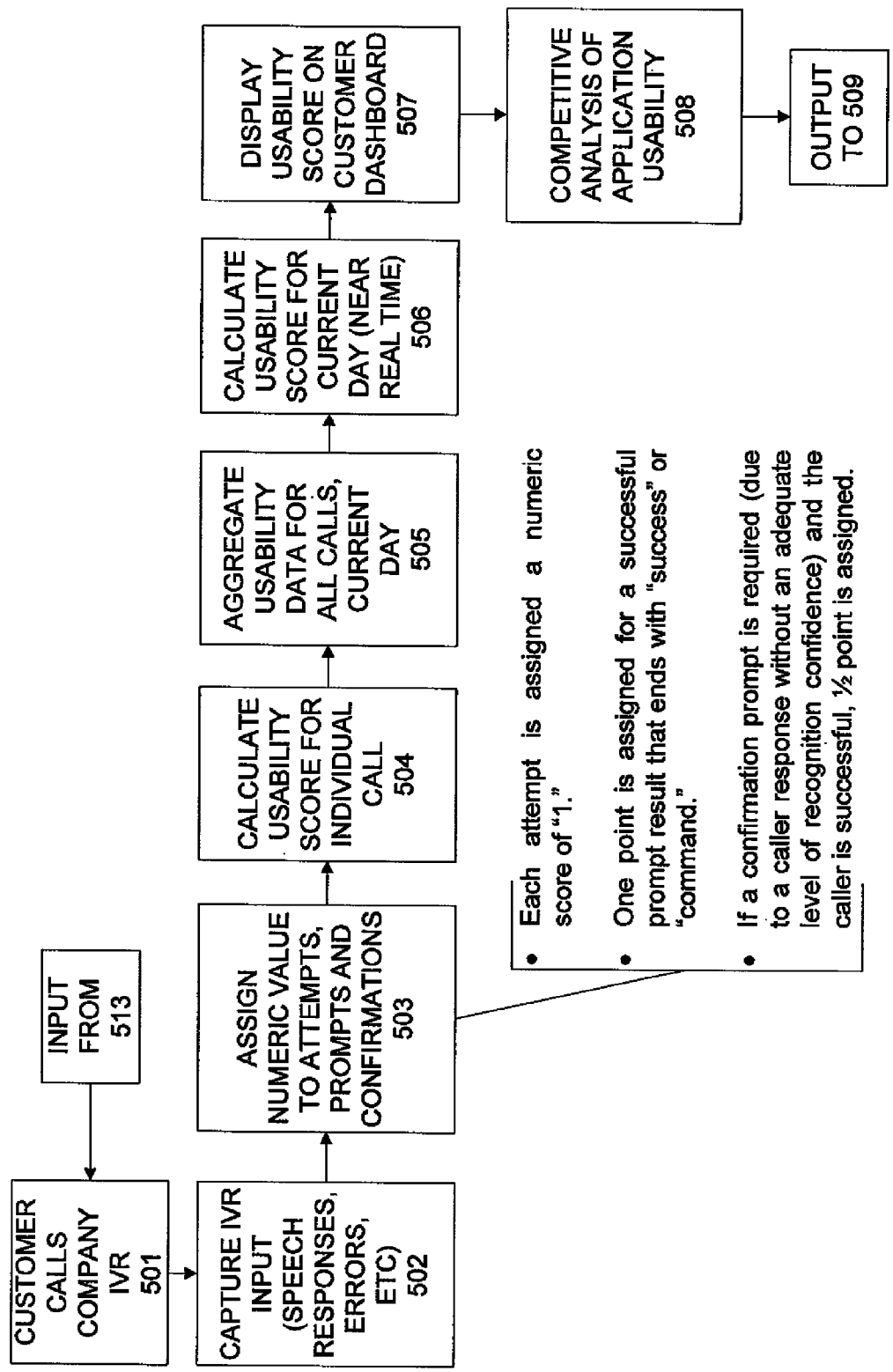
FIGS. 5A, 5B and 6 illustrate example flow diagrams of the operations of processing call data and calculating customer usability scores according to example embodiments of the present invention.

FIG. 5A illustrates an example customer call with an IVR system. Referring to FIG. 5A, a customer calls a company and initiates an IVR menu at operation 501. The company side of the IVR system captures the IVR input (speech, responses, errors, etc.) at operation 502. In operation, the caller attempts to satisfy each IVR prompt (e.g., spoken information, numeric information, requested information, etc.), which are tracked and recorded. Each attempt is assigned a numeric score, such as, for example, "1", at operation 503. A point score is assigned to each IVR prompt. "1" point is assigned for a successful result that ends with "success" or "command." If a confirmation prompt is required (due to a caller response without an adequate level of recognition confidence) and the caller is successful, ½ point may be assigned.

The total number of attempts and total number of points are summed together at the end of each call. A usability score is calculated for the individual call at operation 504. The formula used to calculate the usability score may be {Usability Score=Total Points/Total Attempts}. The usability data for all calls for a current day or similar time frame may also be aggregated at operation 505. The usability score may also be calculated for a current day in near real-time at operation 506. The usability score may be linked to the customer dashboard at operation 507. A competitive analysis of the application usability may also be performed to determine customer data that represents information helpful to understand competitor offerings and services.

Figure 5B:
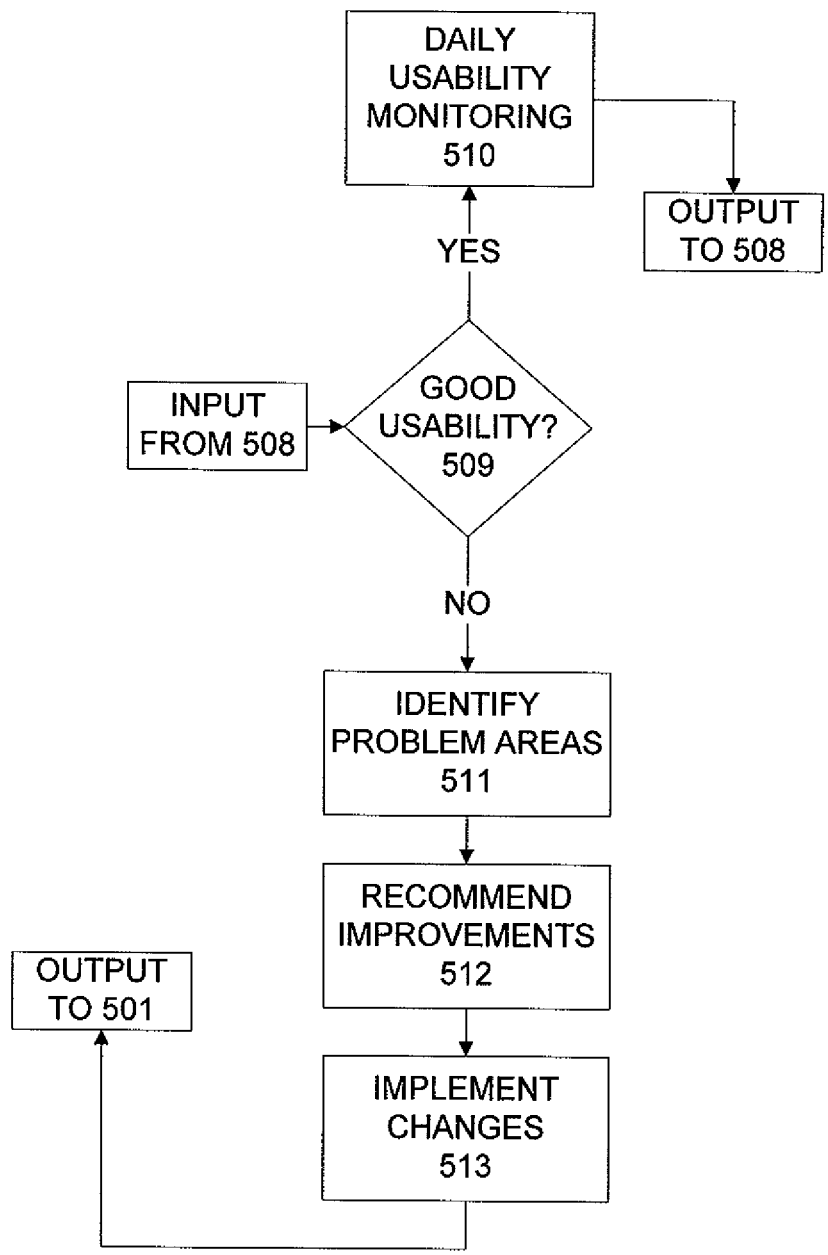

The output of the analysis continues with FIG. 5B at operation 509 which determines whether the usability score is a good score or a poor score. If the usability is good, the daily usability monitoring at operation 510 submits the results to the competitive analysis of the application usability of operation 508, where a competitive analysis may be performed before ending the analysis. If the usability is poor, the data analyst may view the data and identify problem areas at operation 511 based on the source of the poor usability score. Once a determination is made as to the problems encountered, improvements may be recommended at operation 512 and changes implemented at operation 513. The flow of data then proceeds to return back to operation 501 where a recursive model is performed to accept input from the next customer before continuing along the process.

Usability scores for all calls during the current day are summed and used to determine a single usability score for that day's application performance using a formula, such as, {Current Day Usability Score=Sum of Usability Score for All Calls/Total Number of Calls}. The usability score is displayed visually on the dashboard and is updated in real-time as new calls are processed. The usability scores may also be aggregated for specific timeframes and caller segments by aggregating the usability score for the unique group and dividing it by the total number of calls for the segment/timeframe.

Figure 6:
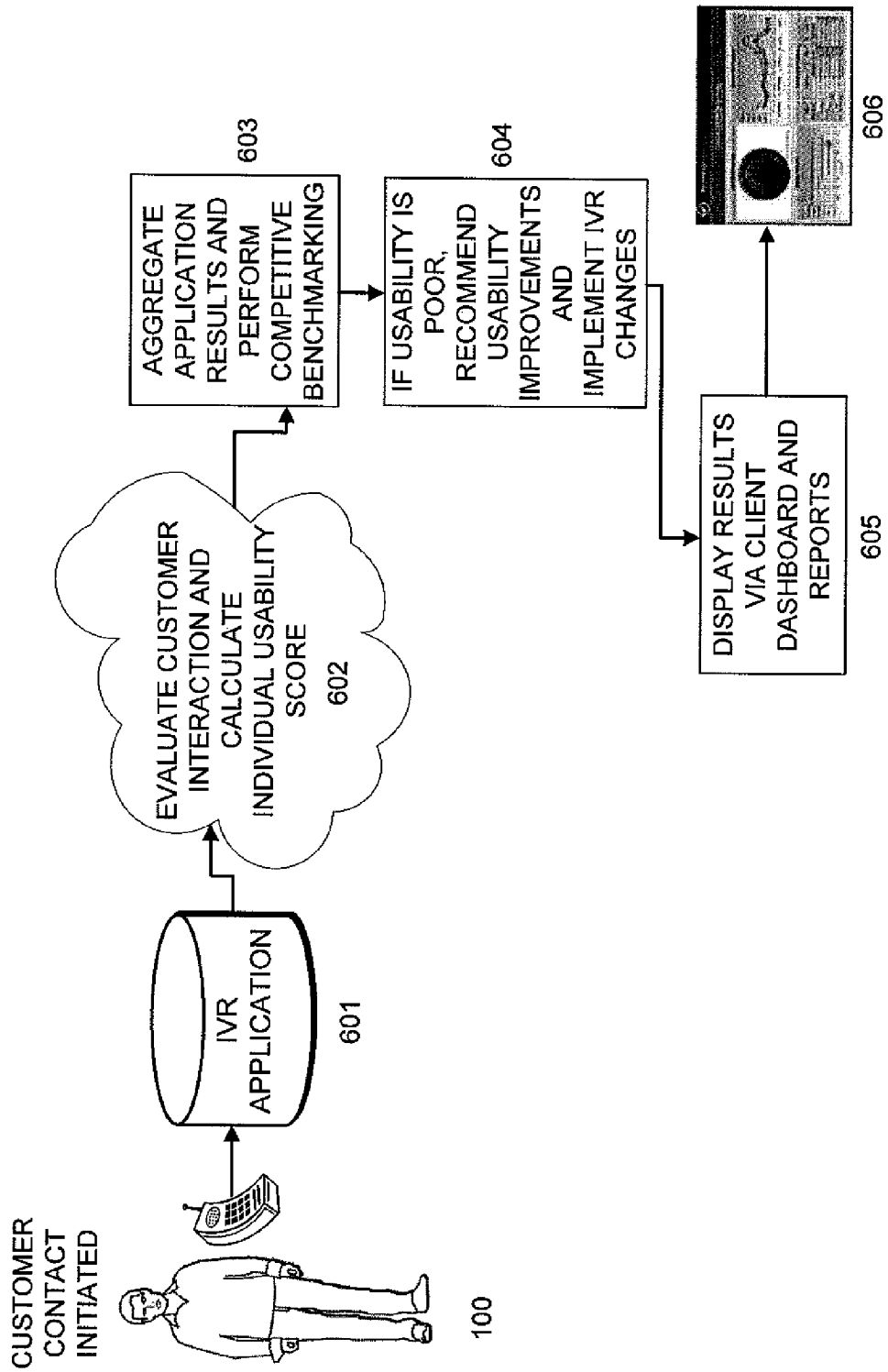

FIG. 6 illustrates an example logic diagram representing the operation of the caller accessing the IVR application, according to example embodiments of the present invention. Referring to FIG. 6, the customer contact is initiated by the caller 100 placing a call to the service center IVR application 601. The customer's interaction data is recorded and evaluated to calculate an individual usability score at operation 602. The application results are aggregated and a competitive benchmarking analysis may be performed to compare the user's experience with competitors' features and options at operation 603. If the conclusion is that usability is poor and could be improved then a recommendation is performed to implement IVR changes at operation 604. The results are displayed on the client dashboard 606, and reports are populated based on the customer usability score and other customer information at operation 605.

The operations of a method or algorithm described in connection with the embodiments disclosed herein may be embodied directly in hardware, in a computer program executed by a processor, or in a combination of the two. A computer program may be embodied on a computer readable medium, such as a non-transitory storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components 100, 110A, 141, 171.

Figure 7:
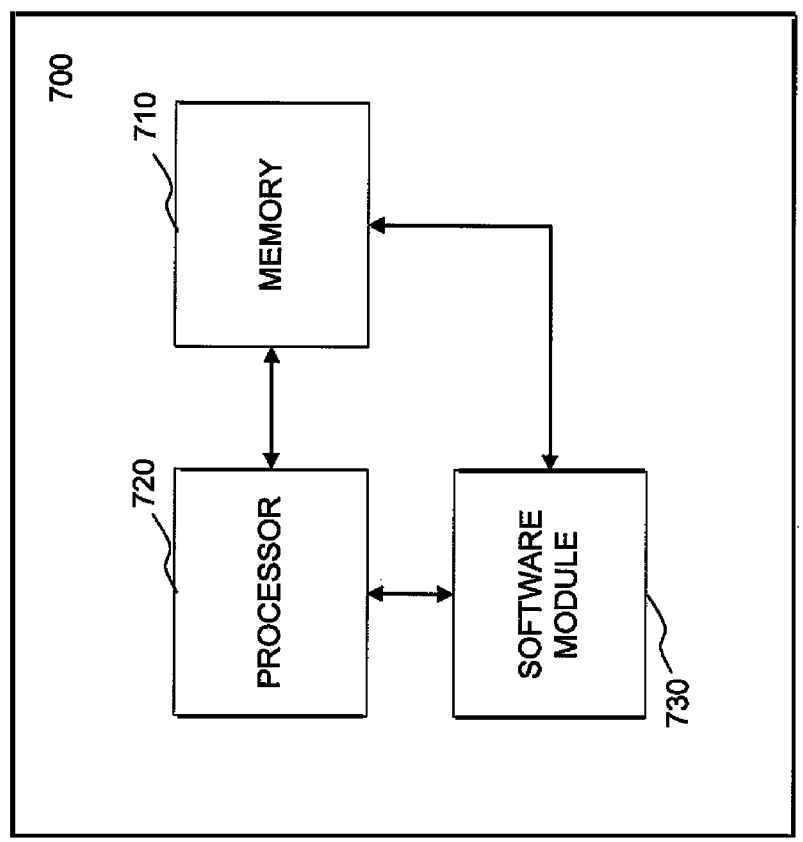
FIG. 7 illustrates an example network entity that may be used to embody the operations performed by the example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

FIGS. 8A and 8B illustrate example tables 800 that include the data from calculated usability scores. For example, the event 801 may include a specific prompt experienced by a customer, such as, "what purpose are you calling for", "technical difficulties", "billing concerns", etc. That event 801 may or may not have been successful at retrieving a positive user response. The result 802, points 803 and attempts 804, represent the end result (success or failure), the number of points awarded and the number of attempts required, respectively. An overall percentage of success may be calculated in column 805 as a usability score. FIG. 8B illustrates a final number of points and attempts and a final overall usability score in column 805.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of processing a customer call, the method comprising:

receiving customer call data;

recording the customer call data in a database server;

performing speech analytics on the recorded customer call data to determine instances of predefined information that occurred during the customer call using a plurality of analytic queries that are searching for specific words and phrases that satisfy content requirements of the analytic queries;

analyzing the customer call data to create a plurality of audio recording files each of which are created based on specific content of the analytic queries, each of which represents a portion of the call data; and displaying the results of the speech analytics on a user interface.

2. The method of claim 1, wherein the customer call data is recorded based on the customer's input and interaction with at least one of a live agent and an automated interactive voice response (IVR) application.

3. The method of claim 2, further comprising:

offering the customer a survey after the call interaction has completed; and storing the results of the customer call data and the survey in the same database server.

4. The method of claim 1, wherein the analytic queries are based on at least one of competitor names, product names, marketing offers, positive sentiment, negative sentiment and agent apology.

5. The method of claim 1, further comprising:

populating the client interface with the audio files to provide real-time access to the portions of the call data associated with customer call and survey results.

6. An apparatus configured to process a customer call, the apparatus comprising:

a receiver configured to receive customer call data;

a memory configured to record the customer call data;

a processor configured to perform speech analytics on the recorded customer call data to determine instances of predefined information that occurred during the customer call using a plurality of analytic queries that search for specific words and phrases that satisfy content requirements of the analytic queries, and the processor is further configured to analyze the customer call data to create a plurality of audio recording files each of which are created based on specific content of the analytic queries, each of which represents a portion of the call data; and a user interface configured to display the results of the speech analytics.

7. The apparatus of claim 6, wherein the customer call data is recorded based on the customer's input and interaction with at least one of a live agent and an automated interactive voice response (IVR) application.

8. The apparatus of claim 7, wherein the processor is further configured to offer the customer a survey after the call interaction has completed, and the memory is further configured to store the results of the customer call data and the survey.

9. The apparatus of claim 6, wherein the analytic queries are based on at least one of competitor names, product names, marketing offers, positive sentiment, negative sentiment and agent apology.

10. The apparatus of claim 6, wherein the processor is further configured to populate the client interface with the audio files to provide real-time access to the portions of the call data associated with customer call and survey results.

11. A non-transitory computer readable storage medium comprising instructions that when executed cause a processor to process a customer call, the processor being further instructed to perform:

receiving customer call data;

recording the customer call data in a database server;

performing speech analytics on the recorded customer call data to determine instances of predefined information that occurred during the customer call using a plurality of analytic queries that are searching for specific words and phrases that satisfy content requirements of the analytic queries;

analyzing the customer call data to create a plurality of audio recording files each of which are created based on specific content of the analytic queries, each of which represents a portion of the call data; and displaying the results of the speech analytics on a user interface.

12. The non-transitory computer readable storage medium of claim 11, wherein the customer call data is recorded based on the customer's input and interaction with at least one of a live agent and an automated interactive voice response (IVR) application.

13. The non-transitory computer readable storage medium of claim 12, wherein the instructions further provide:

offering the customer a survey after the call interaction has completed; and storing the results of the customer call data and the survey in the same database server.

14. The non-transitory computer readable storage medium of claim 11, wherein the analytic queries are based on at least one of competitor names, product names, marketing offers, positive sentiment, negative sentiment and agent apology.

15. The non-transitory computer readable storage medium of claim 14, wherein the instructions further provide:

analyzing the customer call data to create a plurality of audio recording files each of which are created based on specific content of the analytic queries, each of which represents a portion of the call data.

* * * * *